(12) United States Patent
Lin

(10) Patent No.: US 11,742,736 B2
(45) Date of Patent: Aug. 29, 2023

(54) STEP MOTOR WITH SPACING OF SAME-PHASE STATOR POLE GROUPS BASED ON ONE-HALF ROTOR TOOTH PITCH

(71) Applicant: Lin Engineering, Inc., Morgan Hill, CA (US)

(72) Inventor: Ted T. Lin, Saratoga, CA (US)

(73) Assignee: Lin Engineering, Inc., Morgan Hill, CA (US)

( * ) Notice: Subject to any disclaimer, the term of this patent is extended or adjusted under 35 U.S.C. 154(b) by 221 days.

(21) Appl. No.: 17/209,690

(22) Filed: Mar. 23, 2021

(65) Prior Publication Data

US 2022/0115938 A1 Apr. 14, 2022

Related U.S. Application Data

(60) Provisional application No. 63/089,712, filed on Oct. 9, 2020.

(51) Int. Cl.
| | |
|---|---|
| *H02K 37/14* | (2006.01) |
| *H02K 3/28* | (2006.01) |
| *H02K 1/14* | (2006.01) |

(52) U.S. Cl.
CPC ............ *H02K 37/14* (2013.01); *H02K 1/146* (2013.01); *H02K 3/28* (2013.01); *H02K 2213/03* (2013.01)

(58) Field of Classification Search
CPC .............................................. H02K 41/03–033
USPC ............................................ 310/49.01–49.55
See application file for complete search history.

(56) References Cited

U.S. PATENT DOCUMENTS

| | | | |
|---|---|---|---|
| 4,006,375 A | 2/1977 | Lyman, Jr. et al. | |
| 4,031,419 A * | 6/1977 | Spiesberger | H02K 21/16 |
| | | | 310/216.071 |
| 4,155,018 A | 5/1979 | Oudet | |
| 4,190,779 A | 2/1980 | Schaeffer | |
| 4,315,171 A | 2/1982 | Schaeffer | |
| 4,455,499 A | 6/1984 | Sudler | |
| 4,638,195 A | 1/1987 | Lin | |
| 4,758,752 A | 7/1988 | Leenhouts | |
| 4,910,475 A | 3/1990 | Lin | |
| 5,834,866 A | 11/1998 | Fujitani et al. | |

(Continued)

*Primary Examiner* — Quyen P Leung
*Assistant Examiner* — Minki Chang
(74) *Attorney, Agent, or Firm* — Mark Protsik; Thomas Schneck

(57) ABSTRACT

A 2-phase bipolar step motor has a rotor and a stator, the rotor having a plurality of equally spaced rotor poles of alternating north and south magnetic polarities, and the stator having at least eight stator poles extending radially from a stator yoke and terminating in pole shoes interacting radially across an air gap with the rotor poles to cause the rotor to rotate step-by-step when windings around the stator poles are driven by a succession of energized states of the stator. The stator poles divided into four equal groups having a specified drive phase A or B, adjacent poles of a group having alternating drive polarities of the same drive phase A and $\overline{A}$, or B and $\overline{B}$. Adjacent poles in the same group are separated by a center-to-center angle one-half of the rotor tooth pitch or up to 20% larger. Adjacent poles of different groups have a larger separation than that between poles of the same group.

14 Claims, 8 Drawing Sheets

(56) References Cited

U.S. PATENT DOCUMENTS

| | | | |
|---|---|---|---|
| 6,285,104 B1* | 9/2001 | Nashiki | H02K 21/14 |
| | | | 310/198 |
| 9,590,458 B2 | 3/2017 | Chin et al. | |
| 2018/0069462 A1 | 3/2018 | Maeda et al. | |
| 2022/0231589 A1* | 7/2022 | Lin | H02K 37/14 |

* cited by examiner

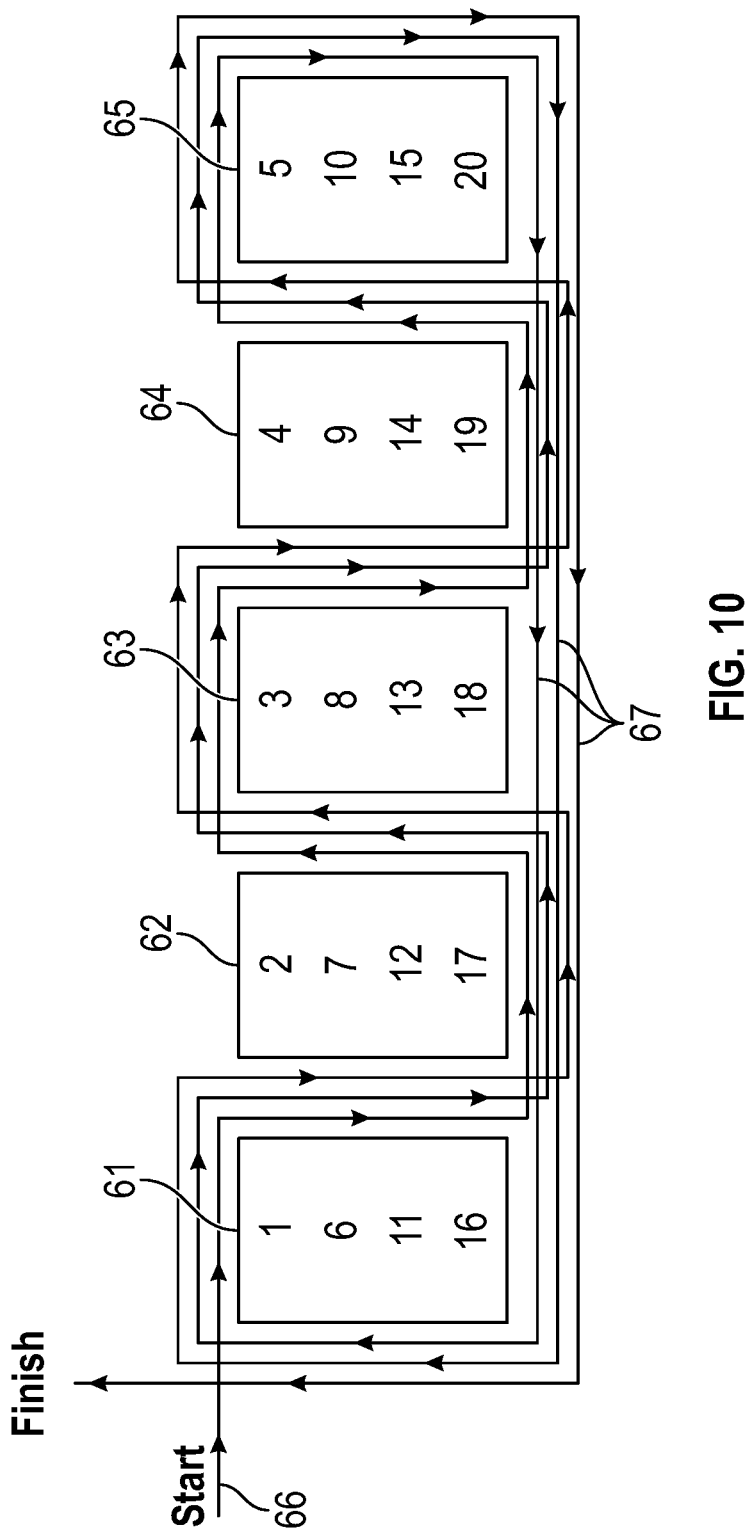

US 11,742,736 B2

STEP MOTOR WITH SPACING OF SAME-PHASE STATOR POLE GROUPS BASED ON ONE-HALF ROTOR TOOTH PITCH

CROSS-REFERENCE TO RELATED APPLICATION

This application claims priority under 35 U.S.C. 119(e) from prior U.S. provisional application 63/089,712 filed on Oct. 9, 2020.

TECHNICAL FIELD

The present invention relates to stepping motors, i.e., dynamo-electric machines with a rotor rotating step-by-step when driven by a succession of energized states of a stator, and specifically to such motors characterized by both the spatial and drive phase distribution of stator poles in relation to the rotor.

BACKGROUND ART

A wide range of motor applications, including the orienting of communication devices, surveillance cameras, and stage lighting, need only relatively low directional resolution, but require adequate dynamic and holding torque from the motors to be able to reorient such equipment at a useful speed. 18° permanent magnet (PM) type stepping motors are frequently used for this purpose because of their speed and torque performance. However, improved motor designs that increase motor speed and reduce motor noise while maintaining high torque are continually being sought.

Among hybrid step motor designs, the most efficient have an 8-pole stator with multiple teeth per pole. A 1.8° 2-phase bipolar hybrid stepper, which has 8 stator poles with 6 teeth per pole (48 total stator teeth) and a hybrid rotor with 50 magnetic north (N) and 50 magnetic south (S) rotor poles, is a popular motor. But although they produce sufficient holding torque and tend to be quiet, their 1.8° stepping angle (200 steps per revolution) is much too fine for low-resolution, high-speed applications. A lower resolution, and thus potentially faster, 3.6° hybrid stepper (100 steps per revolution) has only 4 stator poles with 5 teeth per pole (20 total stator teeth) and a hybrid rotor with 25 N and 25 S rotor poles. However, assuming each stator tooth generates a certain torque, a 3.6° stepper can produce only (20/48) or approximately 42% of the holding torque of the 1.8° stepper.

Even lower resolution 7.5°, 18° and 30° hybrid stepper motors are also available and can potentially move at higher speeds (needing only 48, 20 and 12 full steps per revolution, respectively). However, to use an 18° hybrid stepper as an example, a conventional design for a 2-phase bipolar 18° stepper has Nr (number of N-S pairs of rotor teeth)=20 full steps per revolution/4 mechanical phases=5, and a corresponding rotor tooth pitch of 360°/5=72°. There are thus 5 N teeth and 5 S teeth (10 total rotor teeth) spaced at 36° intervals alternating around the circumference of the rotor. A design with n uniform stator poles must meet the following criteria: Nr/n=x.25 or x.75, where x is an integer in this decimal expression. 5/4=1.25 (which is OK), but 5/8=0.625 (won't work), so the conventional design has only four (not eight) uniform stator poles with a 90° stator pole separation, which is 25% larger than the rotor tooth pitch of 72°.

FIGS. 1-3 show this conventional hybrid step motor design and its magnetic flux utilization for the A-phase ON (0° reference position), B-phase ON (18° position after a full step), and finally an AB-phase ON (an intermediate 9° position after a half-step). A stator 10 has four stator poles 11 connected by an armature 12. Electromagnetic coils 13 and 14 wind around the stator poles 11, forming phase-A coils 13 and phase-B coils 14. (Note, for illustration purposes, only the energized coils are shown in each of the FIGS. 1-3. Unenergized phase coils, although still present, are not shown in any given figure.) A rotor 15 has a set of permanent magnets 16 of alternating N and S magnetic polarity around its circumference that interact with the stator poles 11 across a small cylindrical gap. In FIG. 1, the phase-A coils 13 are energized. The magnetic flux has both a stator component $17_S$ through the corresponding phase-A stator poles 11 and armature 12, and a rotor component $17_R$ through the magnets 16 immediately adjacent the phase-A stator poles and through the interior of the rotor's soft core. Note the exceedingly long flux path. Likewise, in FIG. 2, wherein the phase-B coils 14 are energized, the stator and rotor components $18_S$ and $18_R$ of the magnetic flux path is also quite long. Even in FIG. 3, where both phase-A and phase-B coils 13 and 14 are energized, the resultant magnetic flux paths $19_S$ and $19_R$, though somewhat shorter, still span about 90° of the stator's armature 12. The magnetic flux utilization is poor in this design and therefore performance is low.

Likewise, a conventional 7.5° stepper has a rotor tooth pitch of 30° (12 N teeth and 12 S teeth). The angular separation of adjacent stator poles (of different phase) is 22.5° (=30°×0.75) and the angular separation from phase A to phase Ā (likewise phase B to phase B̄) is 45° (=30°×1.5). The large difference between rotor tooth pitch and stator pole separations means that magnetic flux utilization will be quite poor.

For a conventional 30° stepper, the rotor tooth pitch is 1200 (3 N teeth and 3 S teeth). The angular separation of adjacent stator poles (of different phase) is 90° (=1200× 0.75) and the angular separation from phase A to phase Ā (likewise phase B to phase B̄) is 1800 (=120°×1.5). Again, the large difference between rotor tooth pitch and stator pole separations means that magnetic flux utilization will likewise be quite poor.

In U.S. Pat. No. 4,638,195 to Lin, stator poles of the same phase but different polarities, such as phase A and phase Ā (and likewise, phase B and phase B̄), are placed adjacent to each other, forming same-phase groups. This facilitates the winding process. However, the center-line angular separation of the poles in a group are the rotor tooth pitch times 1.5 or 2.5, adversely affecting the magnetic flux utilization.

In U.S. Pat. No. 4,758,752 to Leenhouts, a two-phase hybrid stepping motor has pole shoes organized into groups (e.g., twenty inwardly extending pole shoes arranged in five groups of four pole shoes), where pole shoes in the same group are uniformly angularly spaced (e.g., at 16.2°) but separated from those of another group by a different angular spacing (e.g., 23.4°). Each group comprises both pole shoes A and C of a first phase and other pole shoes B and D of a second phase; so, a group is not a grouping by phase but solely a physical clustering of the respective pole shoes.

In U.S. Pat. No. 9,590,458 to Chin et al., rotor poles or stator coils are circumferentially skewed in each of several discrete sections. In one embodiment, for example, the motor has a uniform rotor tooth pitch α of 22.5°, while four stator coil sections, each with 12 winding conductors in 3 electrical phases, 2 coils per phase, are circumferentially distanced such that adjacent conductors within the same stator coil section have a first coil pitch $\beta_1$=7.5° and adjacent coils at the ends of different coil sections have smaller second coil pitch $\beta_2=5°$ at one end and a larger third coil pitch $\beta_3=10°$ at the opposite end, creating 1.25° pole displacements between rotor and stator. The discrete stator coil sections of substantially identical construction are physically divided such that no conductor crosses the interface between different coil sections. Each discrete coil section includes stator coils of all three electrical phases of the motor, wherein the conductors extend axially from one axial end of the stator to the other then back again.

SUMMARY DISCLOSURE

A 2-phase bipolar step motor includes four groups of stator poles, wherein each stator pole group includes p stator poles, with p≥2. Organization of stator pole groups is by phase, such that each stator pole in a group represents phases A & $\overline{A}$ alternately (or B & $\overline{B}$ alternately), while adjacent stator pole groups respectively represent different phases A and B. The angle $\alpha$ between the center lines of the adjacent stator poles in the same group is based on the rotor tooth pitch angle times 0.5. The angle $\beta$ between the center lines of the stator poles in the adjacent groups are based on the rotor tooth pitch angle times 0.75 or 1.25.

However, to create extra room for the windings, we can, if desired, increase the angle $\alpha$ by a factor of m, where m is between 1 and 1.2. This may lose a little torque, but only slightly because we keep the factor m smaller than 1.2. For example, with an 18° stepper, we might adjust angle $\alpha$ from 36° to be 42° (42/36=1.167<1.2). Then, the angle $\beta$ will be 48° (=9°–$\alpha$) to accommodate the change of angle $\alpha$.

Since the adjacent stator poles in each group, albeit of the same phase, are of opposite polarities, which therefore requires one to wind in different directions relative to each other, the winding pattern will be alternately forward winding and reverse winding. We also can develop a continuously winding pattern to wind ¾ of each stator pole and move to ¾ of the next stator pole and repeatedly for the number of turns required for easy manufacturing.

The invention fully utilizes the magnet flux on the rotor to develop the maximum torque. We design a small angle between the adjacent stator poles of A & $\overline{A}$ is based on the rotor pitch angle times 0.5, that normally would be the rotor pitch angle times 1.5 or times 2.5 or times 3.5. Thus, we create a short flux path between stator poles. The angle between the adjacent stator poles in the adjacent groups represent phase A and phase B is based on the rotor pitch angle times 0.75 or 1.25.

BRIEF DESCRIPTION OF THE DRAWINGS

FIG. 10 is a schematic representation of an alternative winding pattern for the group of stator poles of the step motor in FIG. 9.

DETAILED DESCRIPTION

Figure 1:
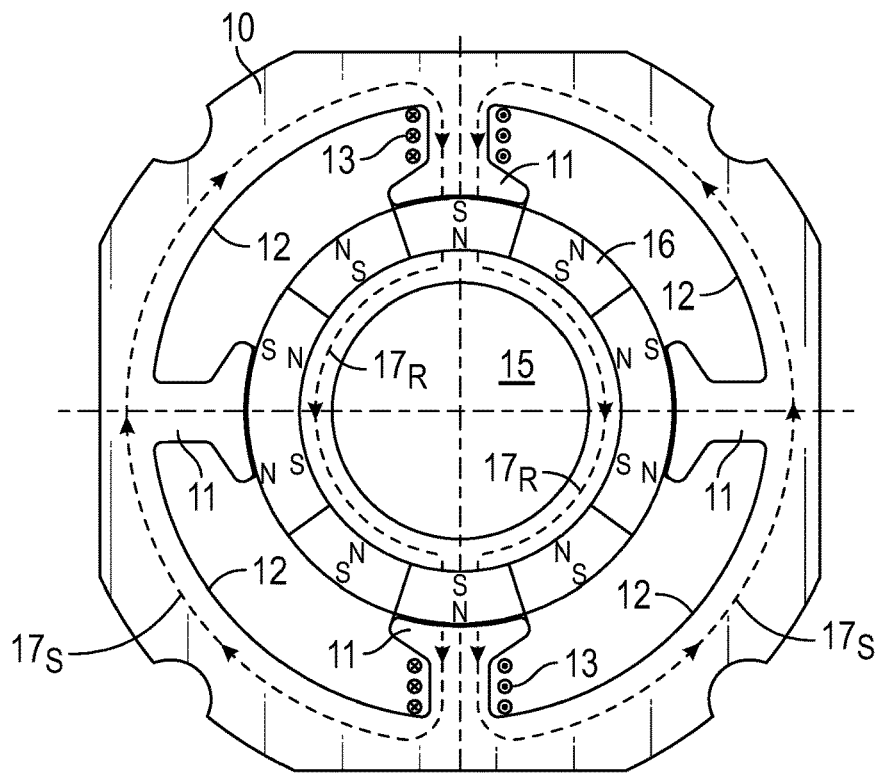
FIGS. 1 through 3 show plan views of a step motor of the prior art with, respectively, phase-A, phase-B, and both phase-A and phase-B coils energized, illustrating the magnetic flux utilization in this conventional design.
Figure 2:
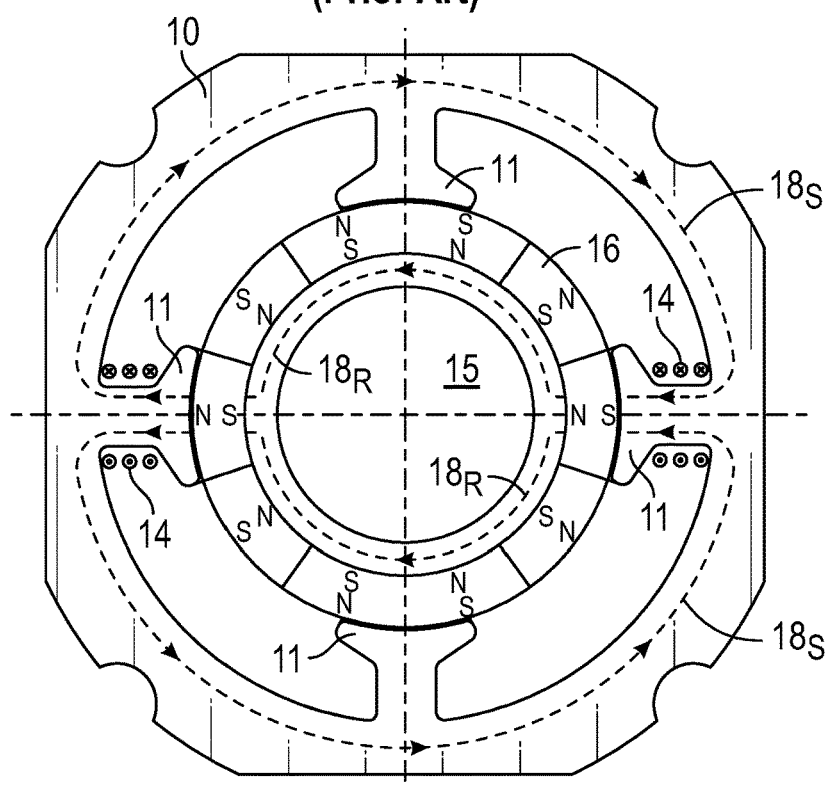
Figure 3:
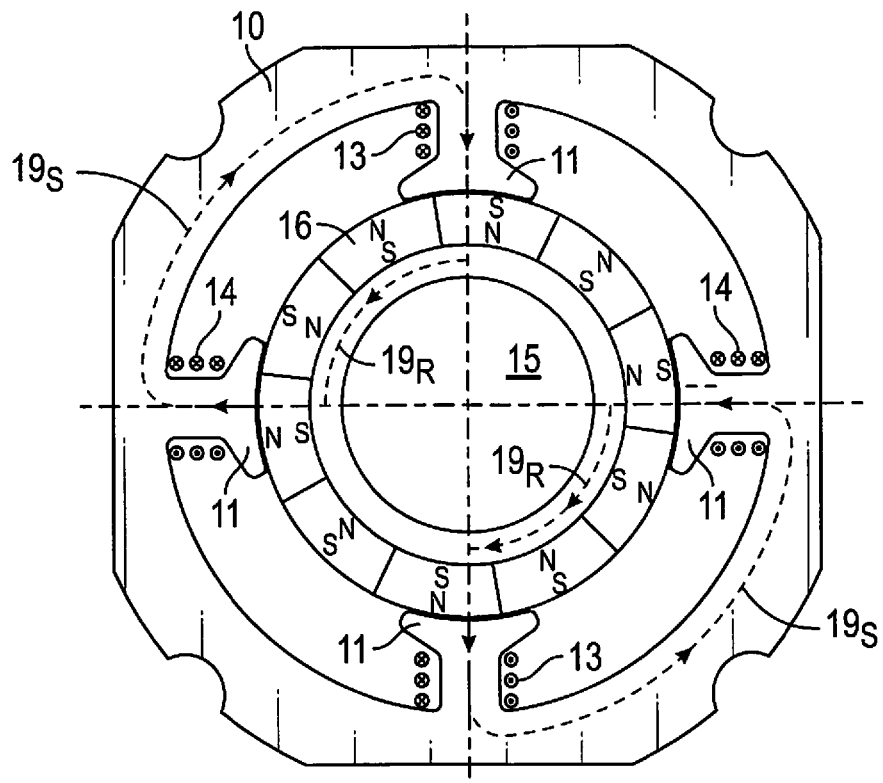

With reference to FIGS. 4 through 7, an embodiment of the present invention is seen that is an 18° stepper (20 steps per revolution) having a rotor pitch angle=72° (5 N and 5 S rotor poles 26), in a design having four groups of stator poles 21, each group corresponding to one and only one specific phase A or B. However, a group has both polarities of its given phase (e.g., A and $\overline{A}$). Each group has two stator poles (for a total of 8 stator poles) ideally separated by 36° (=72°×0.5), but to create enough room for the windings, in practice we may increase the 36° separation by not more the 20%, for example to 42° (42/36=1.167<1.2). Each group develops its own short magnetic flux path as adjacent poles in the same group are energized.

Thus, it is seen that this step motor embodiment has a stator 20 with eight stator poles 21 connected by an armature 22 and with conductive windings around the stator poles 21 forming A-phase coils 23 and B-phase coils 24. A rotor 25 has a set of ten permanent magnets 26 of alternating magnetic polarity interacting with energized stator coils.

Figure 4:
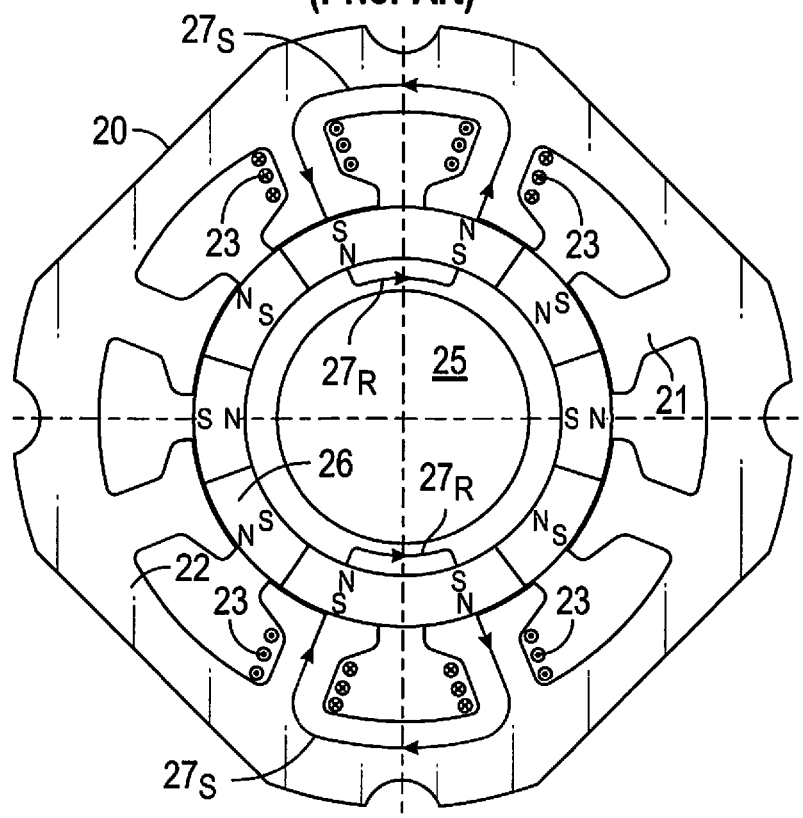
FIGS. 4 through 6 show plan views of a first step motor embodiment in accord with the present invention with, respectively, phase-A, phase-B, and both phase-A and phase-B coils energized, illustrating improved magnetic flux utilization. The phase-B energized view in FIG. 5 represents a 18° full-step in rotor position relative to the phase-A energized view of FIG. 4, while FIG. 6 having both phase-A and phase-B coils energized represents a 9° half-step rotor position relative to FIG. 4.
Figure 5:
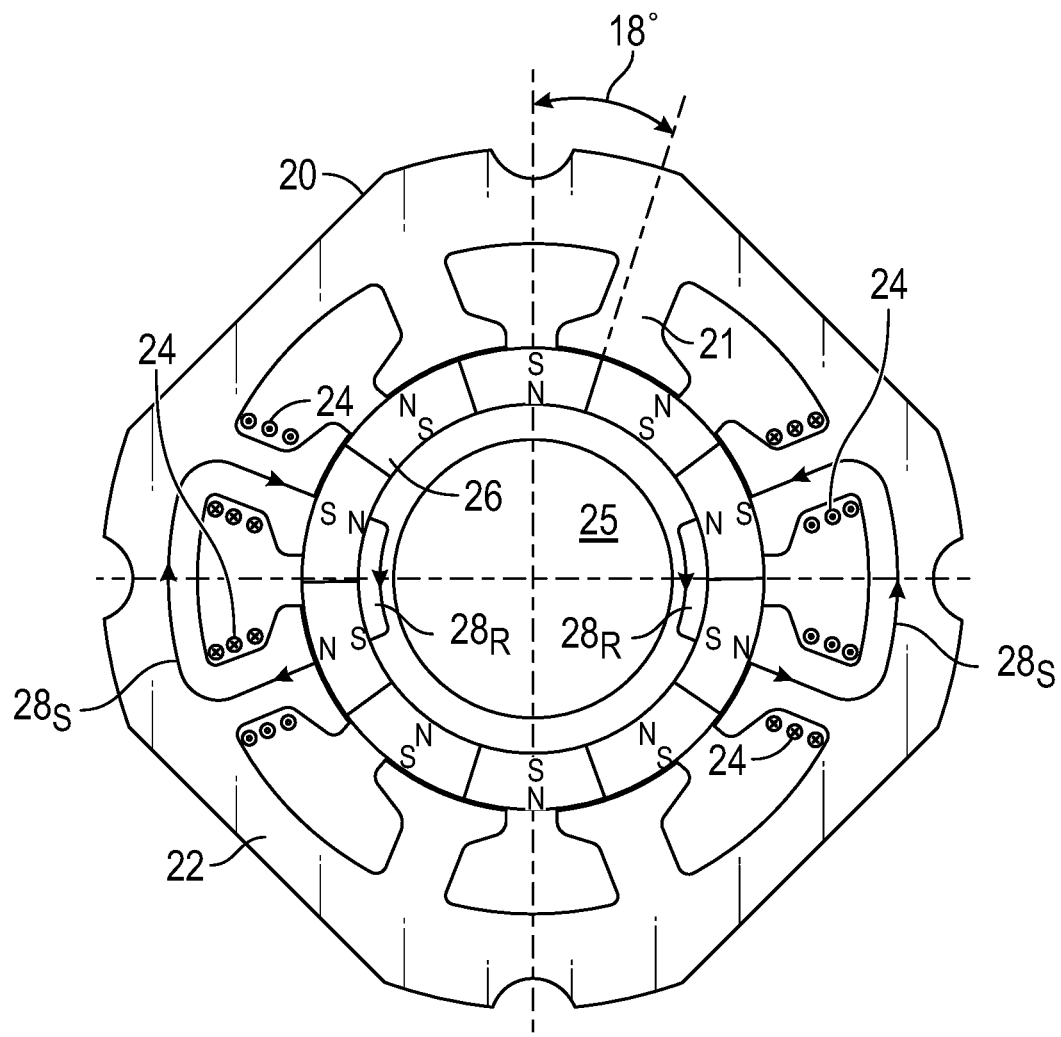
Figure 6:
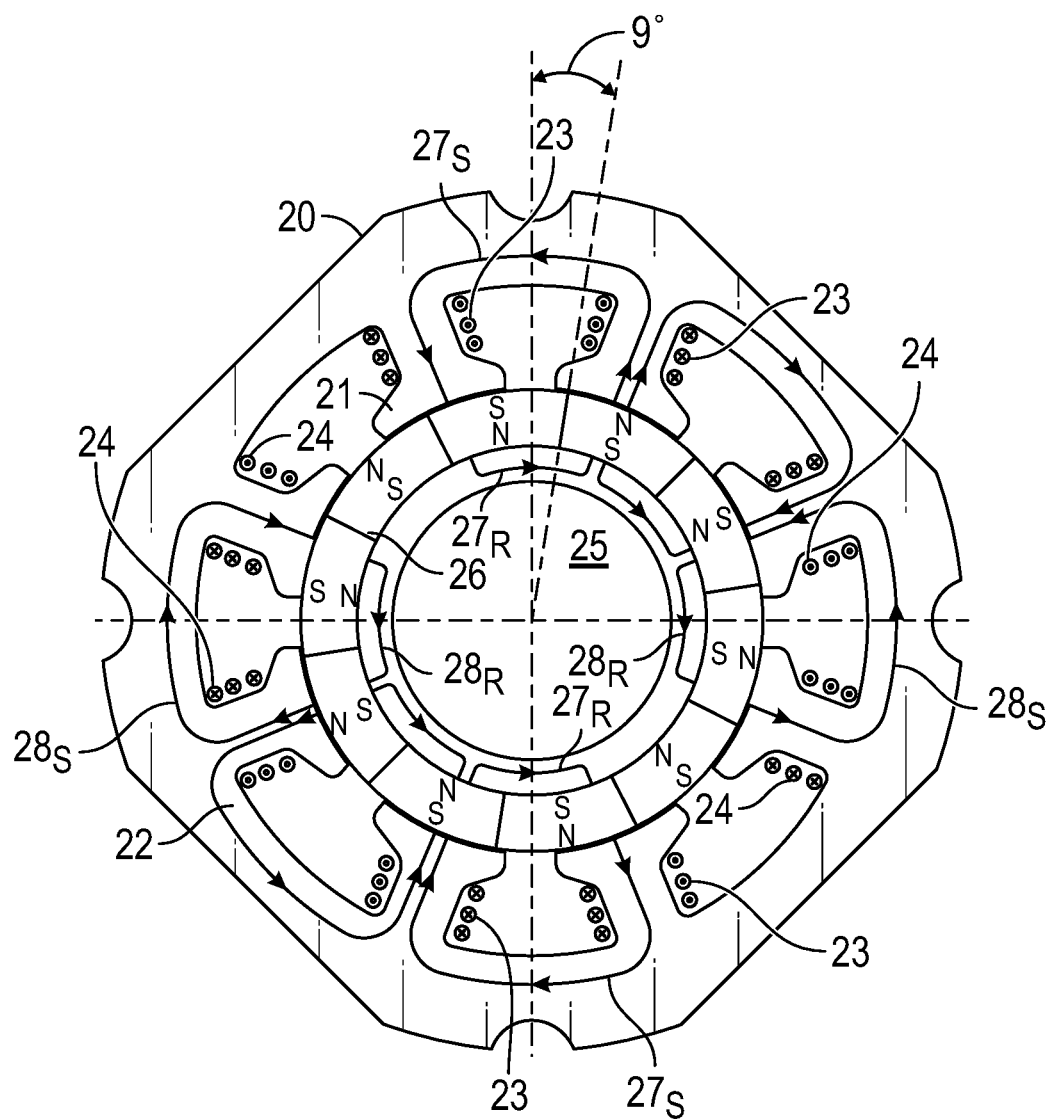

FIGS. 4, 5, and 6 show the magnetic fluxes generated by the energized stator poles in this improved design. In FIG. 4, the A phase coils 23 are energized (A-phase ON state), while the B phase coils 24 are off. The magnetic flux passes from one A-phase stator pole 21 across the cylindrical gap to a rotor pole 26, then returns via an adjacent rotor pole to the other A-phase stator pole 21 of the same group. That is, two A-phase poles 21 are adjacent in the stator 20, forming a short loop flux path $27_S$ and $27_R$. The same thing happens with the group of two more stator poles 21 on the opposite side of the rotor 25. In FIG. 5, the A phase coils 23 are off, while the B phase coils 24 are now energized (B-phase ON). The magnetic flux passes from one B-phase stator pole 21 across the gap to a corresponding rotor pole 26, then returns via an adjacent rotor pole to the other B-phase stator pole 21 of the same group, again forming a short flux path $28_S$ and $28_R$ in the form of a loop. The same thing likewise happens with the group of two more stator poles 21 on the opposite side of the rotor 25. Note that, with B-phase ON, the rotor 25 has stepped 18° relative to its A-phase ON position for the rotor poles 26 to align with the energized stator poles 21. In FIG. 6, both A and B phase coils 23 and 24 are energized (AB-phase ON). Each of the four magnetic flux paths in the four groups form short loops, $27_S$ and $27_R$ for the energized A-phase stator poles and $28_S$ and $28_R$ for the energized B-phase stator poles, as the flux returns to the stator 20 via a pole 21 in the same group from which it originates. In the AB-phase ON state, the rotor poles 26 align best with the corresponding stator poles 21 when they have an intermediate position between the A-phase ON and B-phase ON states, so that it has half-stepped by 9° relative to the A-phase ON position. Here, the magnet flux utilization when adjacent stator poles of the same group are energized is much better than the conventional design. Thus, we obtain an improved performance with the new design.

This embodiment of the invention is using eight stator poles 21 with every two adjacent stator poles forming one group. For an 18° stepper, the rotor pitch is 72° (=18°×4), containing one North magnetic pole and one South magnetic pole in that 72° span, which repeats five times for a total of ten poles 26 (five of each) around the rotor's circumference. The adjacent stator poles in the same group are ideally separated by 0.5 times the rotor pitch, while the adjacent poles in different groups are ideally separated by an angle of 0.75 times the rotor pitch. Thus, in this embodiment the two adjacent stator poles in the same group (and of the same phase A or B) ideally have an angle between the center line of the poles=0.5×72°=36°, while the two adjacent poles in adjacent groups (representing different phases A and B) ideally have an angle between the center line of the pole=0.75×72°=54°.

Figure 7B:
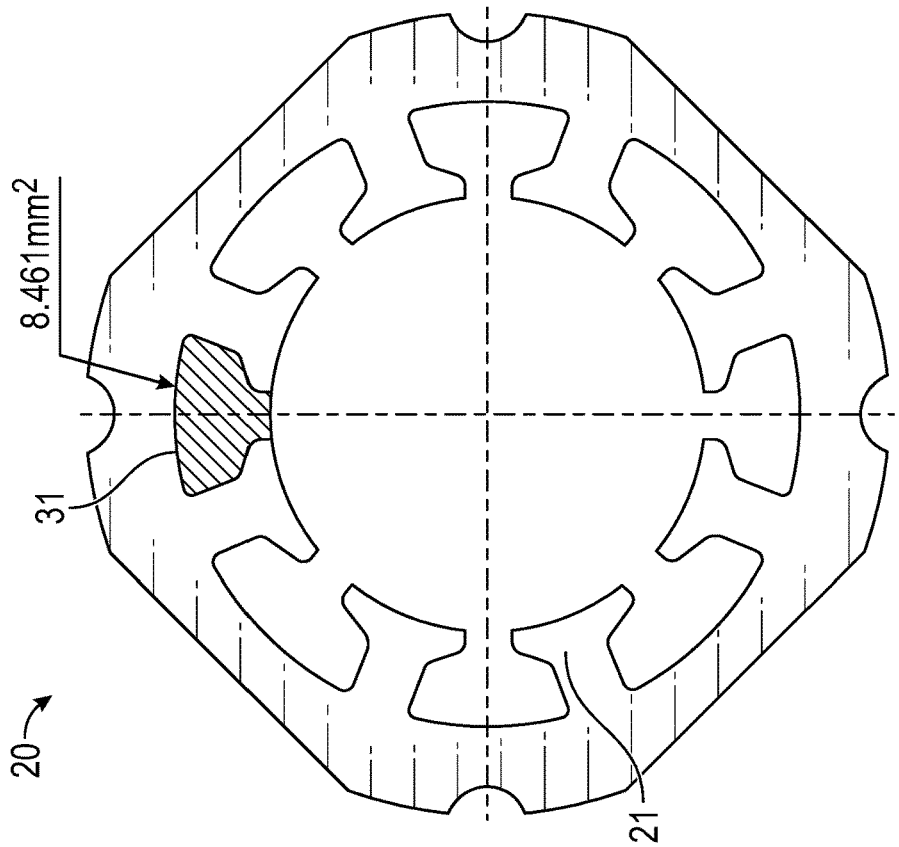
FIGS. 7A-7B are plan views of a stator of the embodiment of FIGS. 4-6, illustrating representative dimensions and angular separations of a typical embodiment in accord with the invention.
Figure 7A:
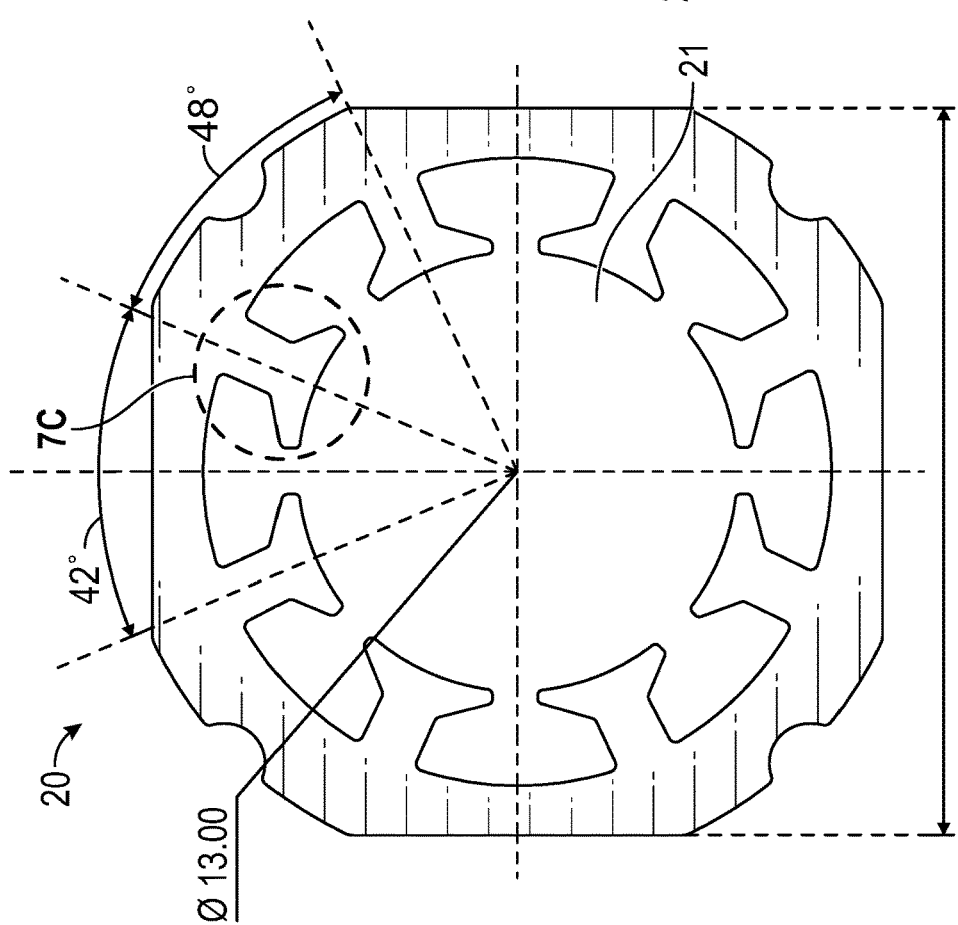
Figure 7C:
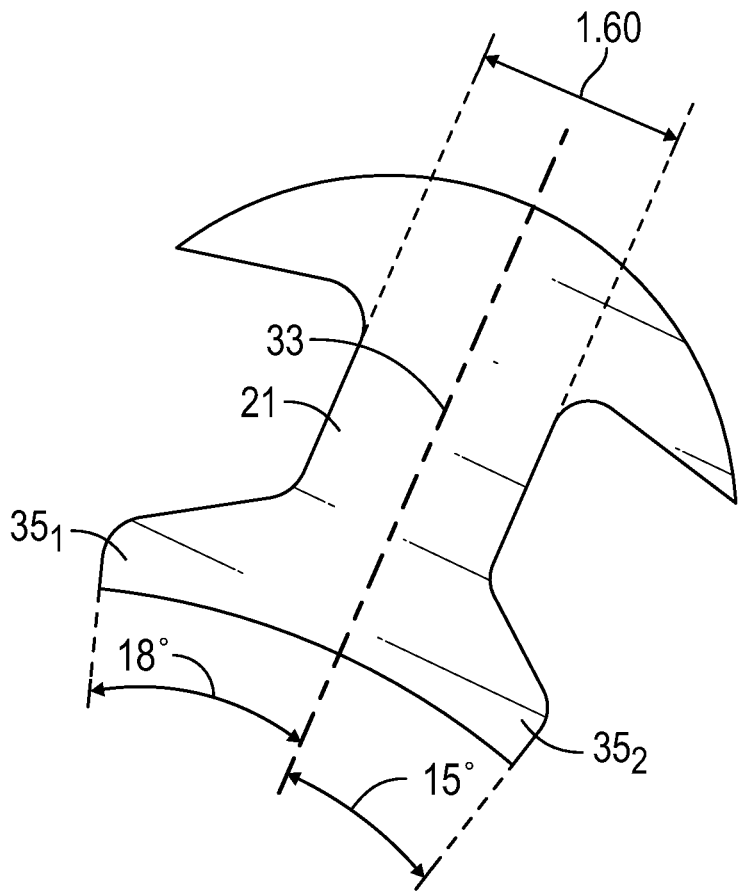
FIG. 7C is an enlarged cut-away plan view of one stator pole with representative dimensions.

However, it may be necessary to create additional room for windings. So, we can increase the angular separation of the same phase stator poles in the same group by up to 20%, albeit with some reduction in torque. For example, one might modify the 36° separation to be 42°. Thus, as seen in FIG. 7A, the adjacent poles in the different groups will now be separated by 48° (=90°−42°). For a 20 mm square stator 20 with stator poles having an inner diameter or 13 mm and the 48° modified center-to-center angular separation, this yields a winding space 31 having an area of about 8.461 mm$^2$, as shown in FIG. 7B. (These dimensions are representative of a typical embodiment and may vary somewhat, as likewise the requisite increase of inter-pole separation can also differ depending on the size of the stator and diameter of the windings.) As seen in FIG. 7C, the stator pole shoes $35_1$ and $35_2$ are slightly skewed toward the larger 48° separation side $35_1$ (18° versus 15° relative to the pole center line 33), so that the inter-shoe gap between poles 21 for the windings is a uniform 120.

Figure 8:
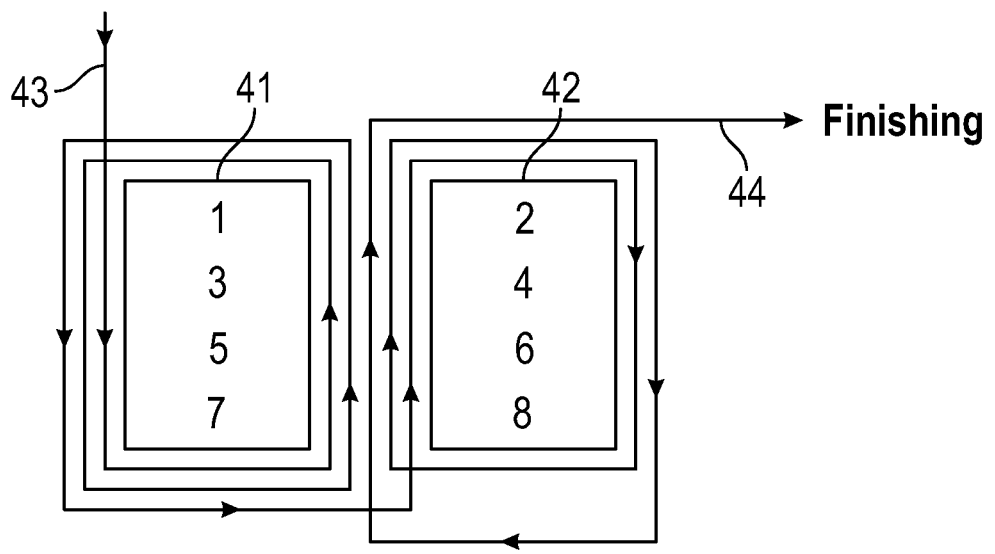
FIG. 8 is a schematic representation of a winding pattern for the groups of stator poles of the step motor in FIGS. 4-6.

For the wiring connections, as seen in FIG. 8: The stator poles 1, 3, 5 and 7 are represented by pole 41 in this schematic and the adjacent stator poles 2, 4, 6 and 8 of the same pole group are represented by pole 42. The windings of a given phase A or B start at lead wire 43 and finish at lead wire 44, with multiple winds around pole 41 in one direction and multiple winds around pole 42 in the opposite direction so that the adjacent stator poles of the same group, while having the same phase, have opposite polarity. The Phase A lead wire=>Starting pole 1=>Finishing pole 2; and connect the Finishing pole 6=>Starting pole 5=>Phase $\overline{A}$ lead wire. Phase B lead wire=>Starting pole 3=>Finishing pole 4; and connect the Finishing pole 8=>Starting pole 7=>Phase $\overline{B}$ lead wire.

Group I—Phase A=poles 1; Phase $\overline{A}$=poles 2
Group II—Phase B=poles 3; Phase $\overline{B}$=poles 4
Group III—Phase A=poles 6; Phase $\overline{A}$=poles 5
Group IV—Phase B=poles 8; Phase $\overline{B}$=poles 7

Figure 9:
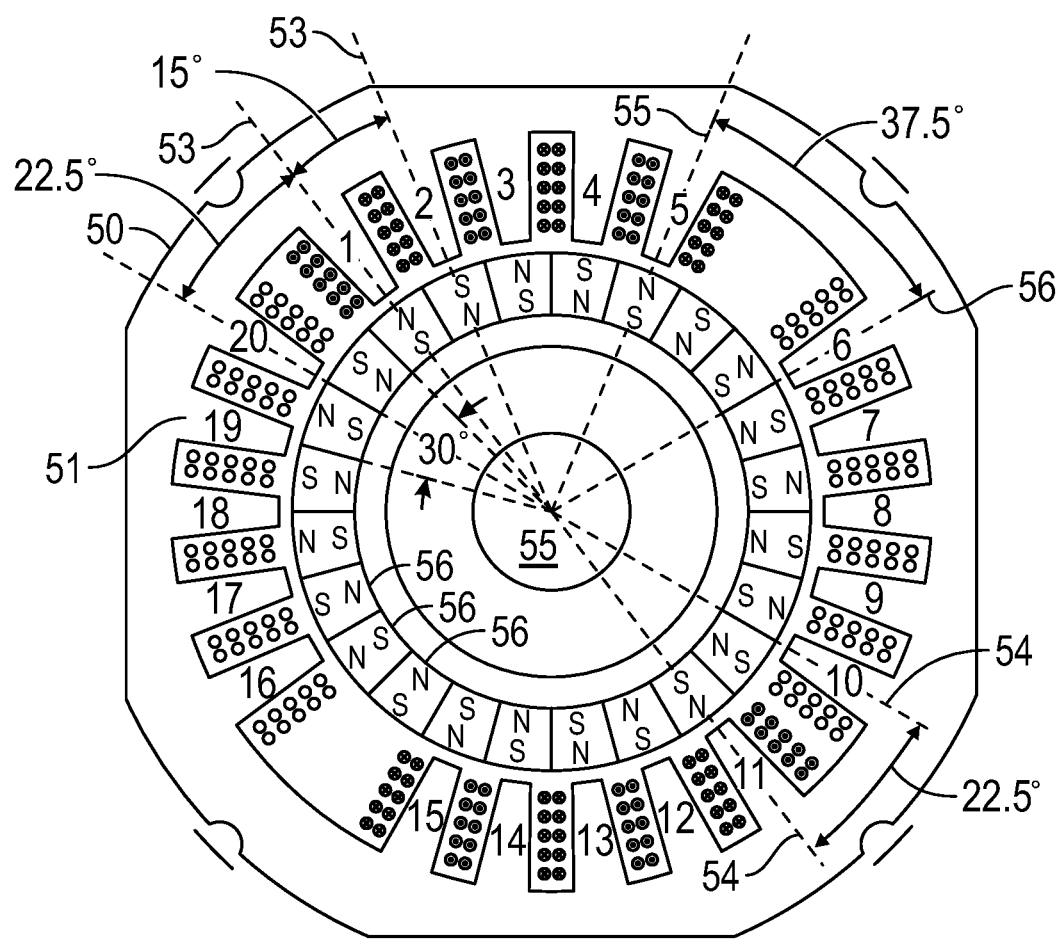
FIG. 9 is a plan view of a second step motor embodiment in accord with the present invention with 7.5° full steps.

With reference to FIG. 9, a 7.5° stepper (48 steps per revolution) having 12 N and 12 S poles is another example of the invention. A rotor 55 has a set of permanent magnets of alternating polarity around its circumference to form rotor poles 56. The rotor pitch angle of the rotor is 3° (=7.5°×4). To utilize the magnet flux from the rotor 55, there is a stator 50 having a 4-group design with 5 stator poles 51 in each group (20 stator poles in total, numbered 1 through 20 in the figure). Poles 1-5 form one group of phase A, poles 6-10 another group of phase B, poles 11-15 a third group of phase A opposite the first group, and poles 16-20 a fourth group of phase B opposite the second group. Within each group, the windings proceed around adjacent poles in opposite directions so that poles, when energized, will also alternate in polarity. The angle between adjacent poles in each group=30×0.5=15°, while the angle between adjacent poles from group to group either=30×0.75=22.5° or =30× 1.25=37.5°. As seen in FIG. 9, the 22.5° inter-group separation and the 37.5° inter-group separation alternate, so that there are two each.

With reference to FIG. 10, due to winding space limitations, rather than increase the adjacent pole separation, which might completely blur the pole groupings, we can instead create a special winding as follows:

For easy manufacturing, we use a continuous alternating winding pattern to wind three of four sides of each stator pole and moving to the next stator pole, again winding three of four sides, but in the opposite direction, and moving again to the next stator pole until all stator poles in the group receive first windings; and then return and repeat for the number of turns required. Thus, in FIG. 10 with five stator poles 61, 62, 63, 64 and 65 in each group with windings 66 proceed ¾ of the way around each pole 61-65 before returning at 67 for the next turn.

Group I: Phase A=poles 1, 3, 5; and
    Phase $\overline{A}$=poles 2, 4;
Group II: Phase B=poles 6, 8, 10; and
    Phase $\overline{B}$=poles 7, 9;
Group III: Phase A=poles 11, 13, 15; and
    Phase $\overline{A}$=poles 12, 14;
Group IV: Phase B=poles 16, 18, 20; and
    Phase $\overline{B}$=poles 17, 19

What is claimed is:

1. A 2-phase bipolar step motor, comprising:
a rotor having a plurality of equally spaced rotor poles of alternating north (N) and south (S) magnetic polarities, there being at most 12 N-S pairs of such rotor poles characterized by a rotor tooth pitch angle; and
a stator having at least eight stator poles extending radially from a stator yoke and terminating in pole shoes interacting radially across an air gap with the rotor poles to cause the rotor to rotate step-by-step when windings around the stator poles are driven by a succession of energized states of the stator, the stator poles divided into four equal groups having a specified drive phase A or B, adjacent poles of a group having alternating drive polarities of the same drive phase A and $\overline{A}$, or B and $\overline{B}$, and center lines of adjacent poles in the same group being separated by an angle α that is a factor in a range from 1.0 to 1.2 times one-half of the rotor tooth pitch angle;
wherein the windings around the stator poles in each group proceed by a single wind in a first direction around three of four sides of a first pole of a group followed by a single wind in an opposite direction around three of four sides of an adjacent pole of that group, continuing in alternating directions in continuous fashion to adjacent poles of the group until all poles of the group are partially wound once, then returning to the first pole of the group for repeated second and subsequent multiple winds of all poles of the group.

2. The step motor as in claim 1, wherein the motor has a 18° full step, five pairs of rotor poles with a 72° rotor pitch, and four groups of two stator poles with a 42° center-to-center stator pole separation between poles of the same group and a 48° center-to-center stator pole separation between adjacent poles of different groups.

3. The step motor as in claim 2, wherein the four groups of two stator poles are arranged around the rotor as successive groups I, II, III, and IV with successive poles 1, 2, 3, 4, 5, 6, 7, and 8, the first and third groups I and III of stator poles being directly opposite from each other and the second and fourth groups II and IV being directly opposite from each other, the first group I of stator poles 1 and 2 having respective drive phases A and $\overline{A}$ of opposite polarity, the second group II of stator poles 3 and 4 having respective drive phases B and $\overline{B}$ of opposite polarity, the third group III of stator poles 5 and 6 having respective drive phases $\overline{A}$ and A of opposite polarity in the reverse order of the first group I, and the fourth group IV of stator poles 7 and 8 having respective drive phases $\overline{B}$ and B of opposite polarity in the reverse order of the second group II.

4. The step motor as in claim 1, wherein the motor has a 7.5° full step, twelve pairs of rotor poles with a 30° rotor pitch, and four groups of five stator poles with 15° center-to-center stator pole separation between poles of the same group and alternating 22.5° and 37.5° center-to-center stator pole separations between adjacent poles of different groups.

5. The step motor as in claim 1, wherein the windings around the stator poles in each group proceed by multiple winds in a first direction around one pole of a group then multiple winds in an opposite direction around an adjacent pole of that group, continuing in alternating directions until all poles of the group are wound.

6. The step motor as in claim 1, wherein stator poles terminate in pole shoes at an inner end adjacent to the rotor, the pole shoes of stator poles adjacent to an adjoining group being skewed toward an intergroup side so that winding gaps between pole shoes are substantially equal in angular extent.

7. The step motor as in claim 6, wherein the motor has four groups of two stator poles with a 42° center-to-center stator pole separation between poles of the same group and a 48° center-to-center stator pole separation between adjacent poles of different groups, the pole shoes extending circumferentially by 15° toward the adjacent pole of the same group and by 18° toward the adjacent pole of different groups to form an equal 12° winding gap between all pole shoes.

8. A 2-phase bipolar 18° step motor, comprising:
a rotor having a five pairs of rotor poles of alternating north (N) and south (S) magnetic polarities, characterized by a 72° rotor tooth pitch; and
a stator having eight stator poles extending radially from a stator yoke and terminating in pole shoes interacting radially across an air gap with the rotor poles to cause the rotor to rotate step-by-step when windings around the stator poles are driven by a succession of energized states of the stator, the stator poles divided into pairs forming four equal groups having a specified drive phase A or B, adjacent poles of a group having alternating drive polarities of the same drive phase A and $\overline{A}$, or B and $\overline{B}$, and center lines of adjacent poles in the same group being separated by an angle α that is a factor in a range from 1.0 to 1.2 times 36°.

9. The step motor as in claim 8, wherein a center-to-center stator pole separation between poles of the same group is 42° and a center-to-center stator pole separation between adjacent poles of different groups is 48°.

10. The step motor as in claim 9, wherein the windings around pairs of stator poles in each group proceed by multiple winds in a first direction around one pole of a group then multiple winds in an opposite direction around an adjacent pole of that group.

11. The step motor as in claim 8, wherein stator poles terminate at an inner end adjacent to the rotor in pole shoes that are skewed toward an intergroup side, the pole shoes extending circumferentially by 15° toward the adjacent pole of the same group and by 18° toward the adjacent pole of different groups to form an equal 12° winding gap between all pole shoes.

12. The step motor as in claim 8, wherein the pairs of stator poles in four groups are arranged around the rotor as successive groups I, II, III, and IV with successive poles 1, 2, 3, 4, 5, 6, 7, and 8, the first and third groups I and III of stator poles being directly opposite from each other and the second and fourth groups II and IV being directly opposite from each other, the first group I of stator poles 1 and 2 having respective drive phases A and $\overline{A}$ of opposite polarity, the second group II of stator poles 3 and 4 having respective drive phases B and $\overline{B}$ of opposite polarity, the third group III of stator poles 5 and 6 having respective drive phases $\overline{A}$ and A of opposite polarity in the reverse order of the first group I, and the fourth group IV of stator poles 7 and 8 having respective drive phases $\overline{B}$ and B of opposite polarity in the reverse order of the second group II.

13. A 2-phase bipolar 7.5° step motor, comprising:
a rotor having twelve pairs of rotor poles of alternating north (N) and south (S) magnetic polarities, characterized by a 30° rotor tooth pitch; and
a stator having twenty stator poles extending radially from a stator yoke and terminating in pole shoes interacting radially across an air gap with the rotor poles to cause the rotor to rotate step-by-step when windings around the stator poles are driven by a succession of energized states of the stator, the stator poles divided into four equal groups of five having a specified drive phase A or B, adjacent poles of a group having alternating drive polarities of the same drive phase A and $\overline{A}$, or B and $\overline{B}$, and center lines of adjacent poles in the same group being separated by an angle α that is 15°, and with alternating 22.5° and 37.5° center-to-center stator pole separations between adjacent poles of different groups;
wherein the windings around the stator poles in each group proceed by a single wind in a first direction around three of four sides of a first pole of a group followed by a single wind in an opposite direction around three of four sides of an adjacent pole of that group, continuing in alternating directions in continuous fashion to adjacent poles of the group until all poles of the group are partially wound once, then returning to the first pole of the group for repeated second and subsequent multiple winds of all poles of the group.

14. The step motor as in claim 13, wherein the windings around the stator poles in each group proceed by a single wind in a first direction around three of four sides of a first pole of a group followed by a single wind in an opposite direction around three of four sides of an adjacent pole of that group, continuing in alternating directions in continuous fashion to adjacent poles of the group until all five poles of the group are partially wound once, then returning to the first pole of the group for repeated second and subsequent multiple winds of all five poles of the group.

* * * * *